(12) United States Patent
Power et al.

(10) Patent No.: US 9,132,768 B2
(45) Date of Patent: Sep. 15, 2015

(54) SYSTEM, METHOD, AND APPARATUS FOR INTEGRAL BACKLIGHT FOR AN AUTOMOTIVE

(71) Applicant: Tata Technologies Pte Ltd, Singapore (SG)

(72) Inventors: Kevin Power, Novi, MI (US); Peter Davis, Novi, MI (US); Anthony Jones, Novi, MI (US)

(73) Assignee: Tata Technologies Pte Limited, Singapore (SG)

( * ) Notice: Subject to any disclaimer, the term of this patent is extended or adjusted under 35 U.S.C. 154(b) by 333 days.

(21) Appl. No.: 13/732,650

(22) Filed: Jan. 2, 2013

(65) Prior Publication Data

US 2013/0170242 A1 Jul. 4, 2013

(30) Foreign Application Priority Data

Jan. 2, 2012 (IN) .............................. 15/MUM/2012

(51) Int. Cl.
*B60Q 1/26* (2006.01)
*B60Q 1/00* (2006.01)
*B60Q 1/30* (2006.01)
*B60Q 1/56* (2006.01)
*B60J 5/10* (2006.01)

(52) U.S. Cl.
CPC . *B60Q 1/00* (2013.01); *B60J 5/101* (2013.01); *B60Q 1/2607* (2013.01); *B60Q 1/268* (2013.01); *B60Q 1/302* (2013.01); *B60Q 1/56* (2013.01); *Y10T 29/49002* (2015.01); *Y10T 29/5313* (2015.01)

(58) Field of Classification Search
CPC .......... B60Q 1/56; B60Q 1/2607; B60Q 1/00; B60Q 1/302; B60Q 1/268; B60J 5/101; Y10T 29/49002; Y10T 29/5313
USPC ......... 362/503, 487, 497, 498, 499; 29/592.1, 29/729
See application file for complete search history.

(56) References Cited

U.S. PATENT DOCUMENTS

| | | | | |
|---|---|---|---|---|
| 4,065,848 | A | * | 1/1978 | Dery ................................ 29/611 |
| 4,373,153 | A | * | 2/1983 | Sano et al. ..................... 340/479 |
| 4,574,269 | A | * | 3/1986 | Miller ............................ 362/503 |
| 4,758,931 | A | * | 7/1988 | Gabaldon ...................... 362/503 |
| 4,896,136 | A | * | 1/1990 | Hotovy .......................... 340/468 |
| 4,954,808 | A | * | 9/1990 | Duerkob ........................ 362/541 |
| 4,976,658 | A |   | 12/1990 | Hood |
| 5,211,466 | A | * | 5/1993 | Jarocki et al. ................. 362/540 |
| 5,272,602 | A | * | 12/1993 | Sasajima et al. .............. 362/549 |
| 5,316,829 | A |   | 5/1994 | Cordes et al. |
| 6,404,334 | B1 | * | 6/2002 | Chao ............................. 340/472 |
| 7,129,444 | B2 |   | 10/2006 | Weiss |
| 7,431,486 | B2 |   | 10/2008 | Bloemen et al. |
| 7,862,220 | B2 |   | 1/2011 | Cannon et al. |
| 8,113,695 | B2 | * | 2/2012 | Meinke et al. ................. 362/351 |
| 2004/0105274 | A1 | * | 6/2004 | Pommeret et al. ............ 362/487 |
| 2011/0279896 | A1 | * | 11/2011 | Uematsu et al. .............. 359/507 |

* cited by examiner

*Primary Examiner* — Anh Mai
*Assistant Examiner* — Glenn Zimmerman
(74) *Attorney, Agent, or Firm* — Merchant & Gould P.C.

(57) ABSTRACT

The present disclosure provides an apparatus, a system and a method for a rear windshield for a vehicle, comprising an integral backlight having a combined surface, wherein the combined surface has an internal surface and an external surface, a plurality of illumination source disposed in a predefined pattern over the combined surface, a conductive grid disposed uniformly on the combined surface, and an apparatus capable of receiving signals disposed on the combined surface.

18 Claims, 2 Drawing Sheets

SYSTEM, METHOD, AND APPARATUS FOR INTEGRAL BACKLIGHT FOR AN AUTOMOTIVE

This application claims benefit of Ser. No. 15/MUM/2012, filed 2 Jan. 2012 in India and which application is incorporated herein by reference. To the extent appropriate, a claim of priority is made to the above disclosed application.

FIELD OF THE INVENTION

The present invention relates to an illumination system in an automotive, more particularly to a modified rear windscreen adapted to act as a single piece pre-assembled backlight.

BACKGROUND OF THE INVENTION

Conventionally the tail light assembly generally comprises of stop light, reverse light, fog light, and turn indicator and all these components are mounted in a cavity on the chassis or vehicle body, independent of backlight or rear windshield. The registration plate illumination is mounted on a trunk or rear bumper just above the registration plate. Assembling of these parts conventionally on the vehicle involves excessive weight, increased cost of packaging, manufacturing complexities, and vulnerability of illumination to likely damages.

With the development in automobile technology and the desire of higher safety standards rear wiper, rear demister (de-fogger or de-froster) and centre high mount stop lamp (CHMSL) became standard accessory in a vehicle. Mounting of these accessories, on a vehicle added to the exiting problem of manufacturing complexities.

In recent years, use of polycarbonate (PC) and polymethylmethacrylate (PMMA), as manufacturing material for automotive glazing components has increased and so is the use of light emitting diode (LED) for all illumination needs.

U.S. Pat. No. 5,316,829 issued to Hans Cordes et al. teaches a method for glazing and for providing a fixture for mounting rear accessories like demister or rear wiper. However, it fails to disclose integration of all units into a single piece backlight. Hans Cordes et al., teaches a method of glazing of windshield or tail light assembly and mounting on a vehicle. The disclosure does not particularly disclose use of light emitting diode (LED) for tail light assembly.

The U.S. Pat. No. 7,129,444 issued to Weiss Keith D teaches high performance defrosters for transparent panels which employs an apparatus for mounting a conductive heating grid on a windshield. It teaches a method of integration of heating grid with a windshield. The patent further teaches a use of polycarbonate (PC) and polymethylmethacrylate (PMMA), as manufacturing material for automotive components like windshield and using the conductive heating grid as a means for de-frosting.

U.S. Pat. No. 7,431,486 issued to Bloemen et al., teaches a use of light emitting diode (LED) as an illumination source for rear light or tail lamp assembly. It teaches a method to enable the LED to act as a source of illumination for stop light, turn indicator, or tail light.

U.S. Pat. No. 7,862,220 issued to Cannon, et al., teaches an integration of light emitting diode with vehicular trims. Its further teaches a method and apparatus for mounting a LED into the vehicle trim.

The illumination arrangements disclosed hitherto are not integrated and vulnerable to damages as they mostly project outwardly from the external surfaces of the vehicle and rear windshield. Hence necessitating an integral backlight with an inherent protection against damages and ease of access for repair.

OBJECTS OF THE INVENTION

The principal object of the present invention is to provide a pre-assembled integrated structure comprising a tail light assembly, CHMSL, rear wiper, de-fogger, and registration plate illuminator.

Another object of the invention is to reduce the number components assembled on a vehicle assembly line.

Yet another object of the invention is to use the transparent material used for backlight as a front covering for tail light assembly.

Yet another object of the invention is to provide an apparatus that utilizes light emitting diode (LED) as a primary source for illumination.

Still another object of the invention is to minimize the involvement of number OEM suppliers for the manufacturing of the body structure.

SUMMARY OF THE INVENTION

Before the present methods and apparatuses are described, it is to be understood that this invention is not limited to the particular apparatus and methodologies described, as there can be multiple possible embodiments of the present invention, which are not expressly illustrated, in the present disclosure. It is also to be understood that the terminology used in the description is for the purpose of describing the particular versions or embodiments only, and is not intended to limit the scope of the present invention, which will be limited only by the appended claims.

In one aspect of the invention, an apparatus is provided comprising of an integrated backlight assembly having tail light assembly, CHMSL, rear wiper, de-fogger, and registration plate illuminator.

In another aspect of the invention, a vehicle is provided having backlight structure made of polymeric material that is pre-assembled with tail light assembly, rear wiper, de-fogger, registration plate illuminator and CHMSL.

In another aspect of the invention, an apparatus is provided having light emitting diode as the primary source of illumination wherein the transparent material of backlight or rear windshield acts as a front cover for the illuminating components.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and product disclosed in the drawings.

DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

Definitions of the Terms

The term vehicle refer to at least one element that can be selected from the group comprising of motor vehicle, automobile, personal transport vehicle, Automated guided vehicle, or self-propelled machines.

The terms "system," "systems," "components" or "parts" refers to a common term "systems" and essentially mean the same.

The terms "defogger," "defroster," or "demister," refers to a common term "defogger" and essentially mean the same.

The terms "registration number," "registration plate," or "number plate," refers to a common term "registration plate" and essentially mean the same.

The terms "glazed surface," or "black surface," refers to a common term "glazed surface" and essentially mean the same.

The terms "taillight," "tail light," or "rear light" refers to a common term "taillight" and essentially mean the same.

Figure 1:
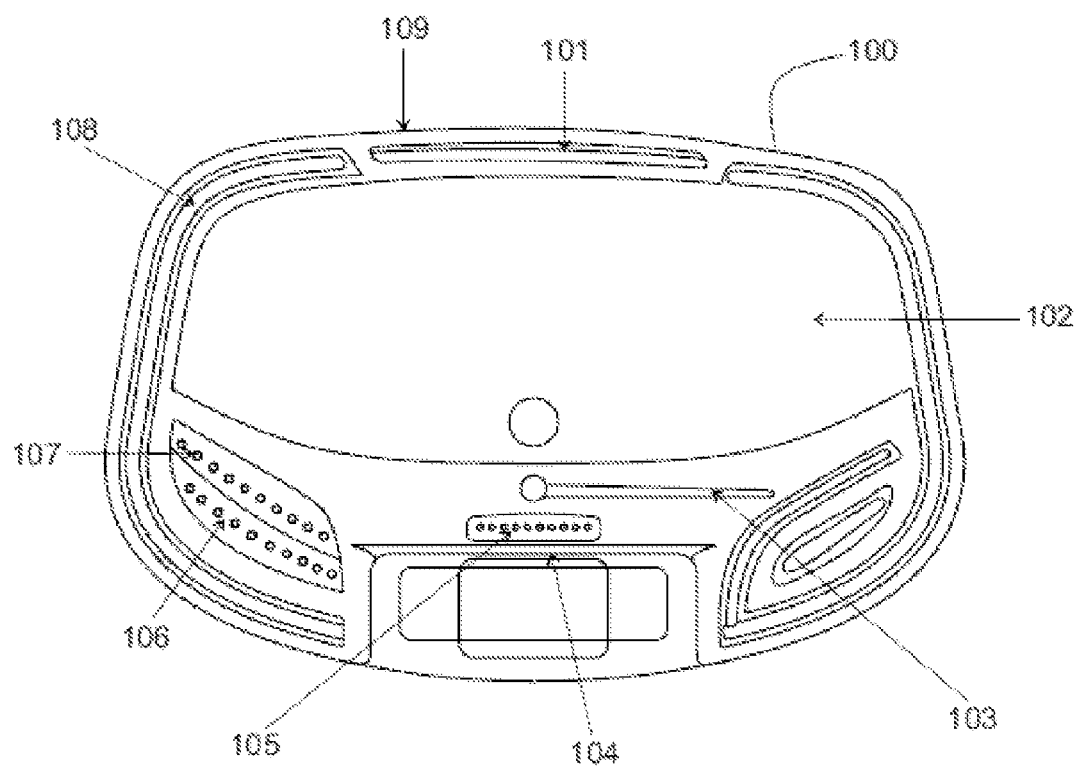
FIG. 1 is a front view of an integral backlight with various components assemblies.

The terms "rear windshield," "windscreen," "rear windscreen," "windshield," or "integral backlight" refers to a common term "integral backlight" and essentially mean the same FIG. 1 shows a front view for the present disclosure. The apparatus comprises of an integral backlight (100) having an internal surface (Not shown) and an external surface (Not shown). There is at least one taillight mounted (108) on the integral backlight (100), housed between the internal surface (Not shown) on a non-vehicle facing side (Not shown) and a cover (Not shown) on a vehicle facing side (Not shown). The taillight (108) is aligned with a side edge of the integral backlight (100) and the internal surface acts as a transparent cover protecting the taillight (108) from atmospheric effects. A taillight assembly comprising of stop light (107) and turn indicator (106), is mounted on the integral backlight (100), enclosed between the internal surface (Not shown) on the non-vehicle facing side (Not shown), and the cover (Not shown) on the vehicle facing side (Not shown). The present disclosure further comprises of a rear wiper (103), having a wiper mounting (Not shown), and a wiper blade (Not shown), mounted on the integral backlight, wherein the wiper mounting is housed on the internal surface (Not shown), and the wiper blade (Not shown), facing the external surface (Not shown). A reverse light (105) is mounted integrally on the external surface (Not shown) of the integral backlight (100), wherein the reverse light (105) is positioned below the rear wiper (103). The reverse light (105) may act as a fog light. A centre high mount stop light (CHMSL) (101) is integrally mounted on the integral backlight (100), positioned near a top edge (109). The present apparatus further comprises of a registration plate illumination (104) mounted on the integral backlight (100) positioned at a bottom edge (Not shown) of the integral backlight (100) providing illumination to a registration plate. The integral backlight (100) further comprises of a conductive grid (102) disposed on the internal surface (Not Shown) of the integral backlight (100). The conductive grid (102) functions as a demister apparatus. The current disclosure further comprises of an apparatus capable of receiving signals.

The vehicle facing side of the various components mounted on the integral backlight mentioned above are electrically connected to the vehicle through a plurality of wire harness. The wire harness supplies power to a plurality of illumination unit like taillight (108), taillight assembly (106, 107), reverse light (105), CHMSL (101), and registration plate illumination (104), and to the rear wiper (103). An illumination source for the plurality of illumination unit is selected from a group consisting of an incandescent light bulb, a xenon, a neon tubes or a light emitting diodes. The conductive grid (102) receives electrical current from the wire harness that helps in defrosting the integral backlight (100). In a preferred embodiment, the illumination source is light emitting diode (LED).

Figure 2:
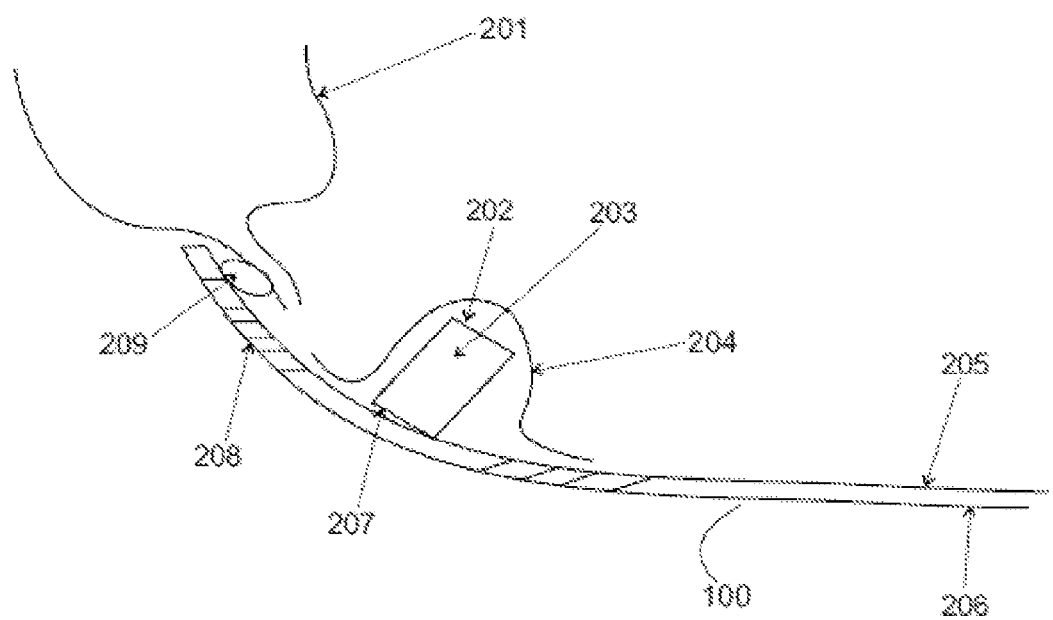
FIG. 2 is a partial top view of the integral backlight.

The FIG. 2, illustrates partial top view of the current disclosure. The FIG. 2, shows a glazed surface (208) having a pattern which defines a profile for the plurality of illumination unit (203). The profile of the glazed surface overlaps the plurality of illumination unit (203). The integral backlight (100) is fastened with the vehicle structure (201) by a sealant (209). Conventionally the sealant used is rubber seal or neoprene seal. In another embodiment of the present disclosure, the integral backlight (100) could be mounted, attached, fixed, welded, or secured with vehicle structure (208). The integral backlight (100) has an internal surface (205) and an external surface (206). The plurality of illumination unit (203) have a non-vehicle facing side (207) and vehicle facing side (202). In a preferred embodiment, the illumination source for the plurality of illumination unit (203) is light emitting diode (LED). A cover (204) comprising a plurality of compartments commensurating with the profile of the integral backlight (100), each compartment adapted to house the plurality illumination unit (203), each compartment separated with a light obstructing wall, wherein the cover (204) provides a housing to the illumination unit (203), and acts as an electro-mechanical insulator. The cover (204) is releasably affixed on the internal surface (205). In a preferred embodiment, the cover (204) is mounted using a fastener like a threaded bolt, a rivet, or simple pushpins.

Materials: Requirements and Performance

The desired qualities of a backlight are:

They should be shatterproof.

They should be sufficiently toughened to resist normal scratches, wear and tear.

It should be transparent so that clear visibility is maintained all time.

They should also be able to protect the passengers from UV radiations.

With recent improvements in glass and plastic industry, the use of glazed surface for windshield has increased. This has also been facilitated by the application of wear resistant coatings. The other change in windshield manufacturing trend has been the use of polycarbonate material specially suited for the use as windshield.

WORKING EXAMPLE OF THE INVENTION

Referring to FIG. 1 and FIG. 2, in a preferred embodiment of the present disclosure an integral backlight (100) having a combined surface, wherein the combined surface has an internal surface (205) and an external surface (206). The integral backlight (100) has a plurality of illumination unit (203) [taillight (108), taillight assembly (106, 107), reverse light (105), CHMSL (101), and registration plate illumination (104)] disposed in a predefined pattern over the combined surface. A conductive grid (102) is disposed uniformly on the combined surface to provide for de-fogging of the integral backlight (100) when needed by an occupant of the vehicle. The integral backlight (100) further comprises of an apparatus capable of receiving signals disposed on the combined surface. The apparatus capable of receiving signals helps in receiving various communication signals. The combined surface is a glazed surface having a predefined profile overlapping the predefined pattern of the plurality of illumination unit (203). This helps in reducing use external components to define the profile for the illumination unit (203), thus reducing number of components, assembling time and since the illumination unit (203) is housed in the integral backlight (100) it protects from minor accidents. The disclosure further comprises of at least one rear wiper (103), having a wiper mounting and a wiper blade, mounted on the integral backlight (100), wherein the wiper mounting is housed on one side of the combined surface and the wiper blade is mounted on a side opposite to the wiper mounting. The integral backlight (100), wherein the combined surface provides a transparent cover to the plurality of illumination unit (203) on a non-vehicle facing side (207). A vehicle facing side (202) of the plurality of illumination unit (203) is electrically connected to the vehicle through a plurality of wire harness. The wire harness supplies power to the various components and is capable of sending signals too. Light emitting diodes (LED) are used for illumination in the plurality of illumination unit (203). The present disclosure is best suited when the rear windshield or the integral backlight (100) has a restrained motion that is it not a part of a lift gate or movable closure.

ADVANTAGES OF THE INVENTION

1. Reduced number of components on the main assembly line.
2. Reduced assembly time during production.
3. As the illumination source are housed in the integral backlight, which is directly mounted on the vehicle this reduces the damages incurred in minor accidents.

We claim:

1. A secure illumination arrangement retrofitted within a rear windshield assembly of a vehicle, comprising:
    an integral backlight having an internal surface and an external surface;
    a plurality of illumination units disposed in a predefined pattern over the integral backlight, wherein the plurality of illumination units comprises a taillight, a taillight assembly, a reverse light, a center high mount stop lamp (CHMSL), and a registration plate illumination; and
    a cover releasably affixed to the integral backlight comprising a plurality of compartments that commensurate with the profile of the integral backlight, each compartment adapted to house one of the plurality of illumination units, wherein each compartment is separated with a light obstructing wall, and wherein the cover provides a housing to each illumination unit.

2. The secure illumination arrangement of claim 1, wherein the reverse light is positioned below a rear wiper disposed over the integral backlight.

3. The secure illumination arrangement of claim 1, further comprising a conductive grid disposed on the internal surface of the integral backlight, wherein the conductive grid facilitates defrosting of the integral backlight.

4. The secure illumination arrangement of claim 1, further comprising an apparatus for receiving signals.

5. The secure illumination arrangement of claim 1, wherein the integral backlight is a transparent panel with a partial glazed surface.

6. The secure illumination arrangement of claim 1, wherein the taillight assembly further comprises a stop light, a turn indicator, and a reverse light.

7. The secure illumination arrangement of claim 1, wherein the cover is electrically connected to the vehicle through a plurality of wire harnesses.

8. The secure illumination arrangement of claim 1, wherein the taillight is aligned with a side edge of the integral backlight and the internal surface provides a transparent cover.

9. The secure illumination arrangement of claim 1, wherein each illumination unit comprises an illumination source selected from the following: an incandescent light bulb, a xenon lamp, a neon tube and a light emitting diode.

10. A rear windshield system for a vehicle, comprising:
    an integral backlight having a combined surface, wherein the combined surface has an internal surface and an external surface;
    a plurality of illumination units disposed in a predefined pattern over the combined surface, wherein the plurality of illumination units comprises a taillight, a taillight assembly, a reverse light, a center high mount stop lamp (CHMSL), and a registration plate illumination;
    a conductive grid disposed uniformly on the combined surface;
    a cover releasably affixed to the integral backlight comprising a plurality of compartments that commensurate with the profile of the integral backlight, each compartment adapted to house one of the plurality of illumination units, and wherein each compartment is separated with a light obstructing wall, wherein the cover provides a housing to each illumination unit; and
    an apparatus capable of receiving signals disposed on the combined surface.

11. A process for manufacturing an integral backlight for a vehicle, comprising:
    glazing a combined surface of the integral backlight in a predefined profile;
    mounting a plurality of illumination sources within a cover, each illumination source covering a substantial profiled area of the glazed combined surface, wherein the plurality of illumination sources are mounted for a plurality of illumination units disposed on the integral backlight, wherein the plurality of illumination lights comprises a taillight, a taillight assembly, a reverse light, a center high mount stop lamp (CHMSL), and a registration plate illumination;
    mounting the cover on the profiled area of the integral backlight, wherein the cover is releasably affixed to the integral backlight comprising a plurality of compartments that commensurate with the profile of the integral backlight, each compartment adapted to house one of the plurality of illumination units, and wherein each compartment is separated with a light obstructing wall, wherein the cover provides a housing to each illumination unit;
    mounting a conductive grid uniformly disposed over the combined surface; mounting a rear wiper assembly on the combined surface;
    providing an apparatus capable of receiving signals disposed on the combined surface; and
    fastening the integral backlight to the vehicle.

12. An apparatus for a secure illumination arrangement in a rear windshield assembly of a vehicle characterized by mounting a plurality of rear components on an integral backlight of the vehicle, wherein the plurality of rear components comprises a taillight, a taillight assembly, a reverse light, a center high mount stop lamp (CHMSL), a rear wiper and a registration plate illumination, and wherein the integral backlight is further affixed to a cover comprising a plurality of compartments that commensurate with the profile of the integral backlight, each compartment adapted to house one of the plurality of illumination units, and wherein each compartment is separated with a light obstructing wall, wherein the cover provides a housing to each illumination unit.

13. The rear windshield system of claim 10, wherein the combined surface is a glazed surface having a predefined profile overlapping the predefined pattern of the plurality of illumination units.

14. The rear windshield system of claim 10, further comprising a rear wiper positioned above the reverse light.

15. The rear windshield system of claim 10, wherein the combined surface provides a transparent cover to the plurality of illumination units on a non-vehicle facing side.

16. The rear windshield system of claim 10, wherein the rear windshield has a restrained motion.

17. The process for manufacturing the integral backlight of claim 11, wherein the plurality of illumination sources are disposed on the integral backlight such that the predefined profile of the glazed combined surface overlaps with the plurality of illumination sources.

18. The rear windshield system of claim 15, wherein a vehicle facing side of the plurality of illumination units is electrically connected to the vehicle through a plurality of wire harness.

* * * * *